Figure 1:
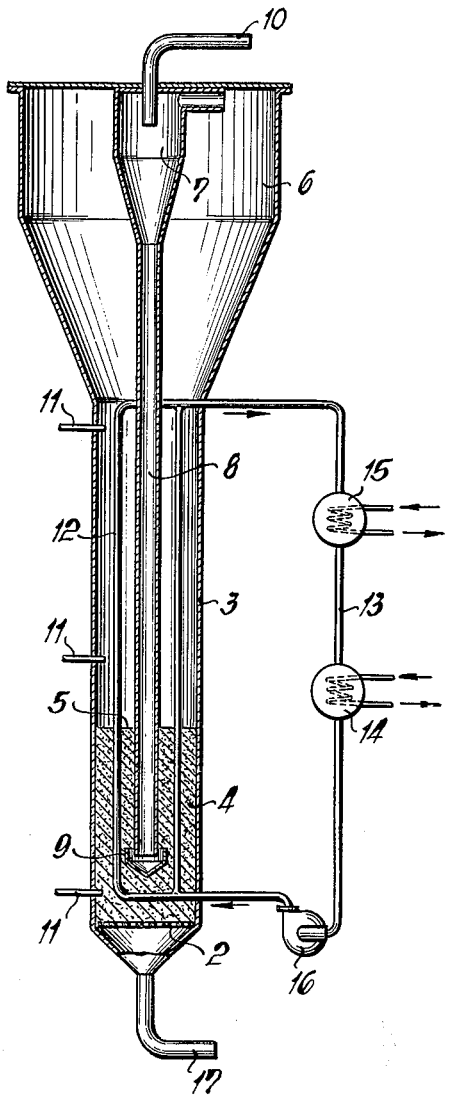

May 31, 1966 K. SENNEWALD ETAL 3,254,110
PROCESS FOR PREPARING UNSATURATED NITRILES
Filed April 17, 1962 2 Sheets-Sheet 1

INVENTORS
Kurt Sennewald
Wilhelm Vogt
Joachim Kandler
Rolf Sommerfeld
Gunter Sorbe
BY Connolly and Hutz
ATTORNEYS 3,254,110
PROCESS FOR PREPARING UNSATURATED NITRILES
Kurt Sennewald, Wilhelm Vogt, and Joachim Kandler, Knapsack, near Cologne, Rolf Sommerfeld, Stetten, Remstal, and Günter Sorbe, Bruhl, near Cologne, Germany, assignors to Knapsack-Griesheim Aktiengesellschaft, Knapsack, near Cologne, Germany, a corporation of Germany
Filed Apr. 17, 1962, Ser. No. 188,221
Claims priority, application Germany, Apr. 18, 1961, 43,494
5 Claims. (Cl. 260—465.3)

The present invention is concerned with a process for preparing unsaturated nitriles by reacting olefins with ammonia and oxygen in the gaseous phase in the presence of a catalyst. The invention is concerned, in particular, with the preparation of acrylonitrile from propylene and of methacrylonitrile from isobutylene.

The reaction of olefins with ammonia in the presence of oxygen which results in the formation of nitriles has been known for some time already. Catalysts which are suitable for use on an industrial scale and which enable good yields, high degrees of conversion and a great efficiency of the catalyst to be obtained are also known. U.S. patent application Serial No. 155,309 filed on November 28, 1961 (now abandoned) for example, provides a catalyst which comprises iron oxide, bismuth oxide and molybdenum oxide and which can be used with particular advantage in flowing bed reactor or in a fluidized bed reactor.

The said catalysts, however, have the drawback of being very expensive, which, in particular, is due to their content of bismuth oxide. When a catalyst of the aforesaid kind is prepared the cost of the bismuth oxide amounts to two thirds of the cost of the active oxidic components. Besides, when using the bismuth salts their physiological properties have to be taken into consideration.

For these reasons high requirements have to be met with respect to the working up and recovery of such catalysts. When the reaction is carried out in a fluidized bed which is the advantageous mode of operating there is, for example, always rubbed off a certain portion of the catalyst. These pulverulent portions have to be separated and the bismuth contained therein has to be recovered by decomposition, if possible in a quantitative yield, and this required additional apparatus and acid.

Now we have found that catalysts of appropriate composition which do not contain bismuth can also have a great efficiency and enable high degrees of conversion and high yields to be obtained. These efficient catalysts are combinations of oxides of the transition elements with molybdenum oxide. In addition to these oxides the catalysts contain a carrier, which preferably is silicic acid. As transition elements are preferably used the elements of the first transitional period, for example, Ti, V, Cr, Mn, Fe, Co, Ni, Cu, and Zn, the elements of the group of iron, viz. Fe, Co, and Ni, as well as V, Cr and Mn having proved particularly suitable. The catalysts according to the invention contain either one or more of the said metals in the form of its or their oxides in combination with molybdenum oxide. The catalysts used advantageously comprise iron oxide and/or nickel oxide and molybdenum oxide and, if desired, another oxide of a transition metal deposited on a carrier. The process of the present invention is, however, not limited to the use of iron- or nickel-containing catalysts.

The catalysts may contain phosphorus pentoxide as a further component.

The oxides are deposited on a carrier, which preferably is silicic acid. Other inert materials, such a pulverized pumice, smelter-slag pumice, kieselguhr, aluminum oxide or alumina may also be used. The content of carrier material is relatively high, so that, in particular, the stability attained is sufficient to enable the use of the catalyst in a fluidized bed.

A particular advantage of the process according to the invention resides in the fact that a processing of the catalyst which has been used or eliminated from the fluidized bed in pulverulent form can be dispensed with to a large extent since the catalysts used in the process according to the invention, for example a catalyst comprising iron oxide, nickel oxide and molybdenum oxide which can be used with particular advantage, are much cheaper than the bismuth-containing catalysts.

The composition of the active oxide mixture may vary within wide limits. If this composition is indicated by the general formula $Me_aMo_bP_c$, from which the oxygen component has been omitted and in which the symbols $a$, $b$ and $c$ stand for the numbers of atoms in which the individual components are present, $a$ may vary within the range of 1 to 20, $b$ may vary within the range of 1 to 10 and $c$ may vary within the range of 0 to 3. Me stands for one or more metals of the first transitional period of the Periodic Table of elements, preferably iron and/or nickel, in which case the number of atoms ($a$) of each individual metal must not exceed 10.

The active components may be deposited on the carrier in known manner, for example, by evaporating a solution of a corresponding salt together with a colloidal solution, suspension or paste of the carrier material. As metal salts there may be used, for example, the nitrates, if desired in solution in nitric acid, or the ammonium salts of the metals concerned. Instead of ammonium molybdate may be used molybdenum oxide, molybdic acid or phosphomolybdic acid. Phosphorous pentoxide is in general used in the form of concentrated phosphoric acid. Silicic acid, which serves as carrier material, is introduced into the solution in the colloidal state or silica gel serving as carrier material is introduced into the solution in pieces having a diameter of about 2 to 4 millimeters. The catalyst is finally sintered at a temperature within the range of about 300° to 800° C., preferably about 450° to 700° C. The quantity of the carrier material amounts to 30 to 95% by weight, advantageously 50 to 80% by weight, of the finished catalyst.

The great efficiency of the catalysts according to the present invention is evident by the fact that the working temperatures are lower than in the known processes. The process according to the present invention is carried out at a temperature within the range of 300° to 465° C., preferably 350° to 450° C.

The catalysts are used, in particular, in a moving state in a flowing or fluidized bed reactor, the grains of the catalysts having a diameter within the range of 0.01 to 1.0 millimeter, preferably 0.05 to 0.5 millimeter. It is also possible to use a solid bed catalyst.

The process according to the invention enables high yields and high degrees of conversion to be obtained in addition to a high efficiency of the catalyst, which has hitherto only been possible by the use of the expensive bismuth-containing catalysts according to the abovementioned specification. If, in order to characterize the efficiency of the catalyst, the yield per volume of the catalyst is illustrated by the following equation:

$$\frac{\text{quantity of nitrile formed (in grams)}}{\text{liter of catalyst·time (in hours)}}$$

$$= \frac{\text{grams}}{\text{liters·hours}} \text{ of nitrile}$$

and if the activity of the catalyst components is equal to the following equation:

$$\frac{\text{quanity of nitrile formed (in kilograms)}}{\text{quanity of active component (in kilograms)} \cdot \text{time (in hours)}} = \frac{\text{kilograms}}{\text{kilograms} - \text{hours}} \text{ of nitrile}$$

the yields per volume of catalyst according to the present invention are within the range of $$70 \text{ to } 120 \frac{\text{grams}}{\text{liters} \cdot \text{hours}}$$

of acrylonitrile and the yields obtained by the activity of the component are within the range of $$0.5 \text{ to } 1.3 \frac{\text{kilograms}}{\text{kilograms of MoO}_3 \cdot \text{hours}}$$

of acrylonitrile when the process is carried out under normal pressure. The aforesaid yields show that the catalyst, in particular the molybdenum oxide it contains, has well been utilized.

The high efficiency of the catalyst is associated with a high selectivity manifesting itself in high yields and high degrees of conversion which have hitherto not been obtained by means of catalysts that do not contain bismuth. When propylene is reacted the yields of utilizable and serviceable products (i.e. acrylonitrile, acetonitrile and hydrocyanic acid, which will hereinafter be referred to as the total quantity of nitriles) amount to more than 80%, calculated on the propylene converted, and to more than 90%, calculated on the ammonia converted. The yields are defined as follows:

Yields in percent, calculated on propylene $$= \frac{\text{mols of carbon present in the nitriles formed}}{\text{mols of converted propylene} \cdot 3} \cdot 100$$

Yield in percent, calculated on ammonia $$= \frac{\text{mols of nitrogen contained in the nitriles formed}}{\text{mols of converted ammonia}} \cdot 100$$

The conversion, which is indicated in percent, designates, as is usual, the proportion of the mols of propylene or ammonia which have undergone conversion to the mols of propylene or ammonia used as starting material.

In conformity with the good yields, the degrees of conversion according to the process of the present invention may amount to more than 90%. The particular advantage of this mode of operating consequently also resides in the fact that the unconverted portions of propylene and ammonia need not be returned. Acrylonitrile, acetonitrile and hydrocyanic acid may, for example, be separated in the usual manner from the exhaust gas leaving the reaction vessel by washing said exhaust gas with dilute sulfuric acid, whereby the ammonia is neutralized. The exhaust gas which has been subjected to the washing may be discarded. It only contains small quantities of propylene.

The pressure under which the reaction is carried out is of no decisive importance. It has a small influence on the efficiency of the catalyst. If it is desired to increase the efficiency of the catalyst to such an extent that the yields exceed those mentioned above the process may be carried out under a slightly superatmospheric pressure. However, the particular advantage of the process according to the present invention is that it enables an extraordinarily high efficiency of the catalyst to be realized, even under normal pressure. In general, a pressure within the range of 0.3 to 10 atmospheres (absolute), preferably 1 to 5 atmospheres (absolute), is used.

The time of stay of the gas mixture in the reaction vessel may vary within certain limits. It cannot, however, be varied in an independent manner when the process is carried out in a fluidized bed reactor. We have found that, in the process according to the present invention, the fluidized bed is preferably moved by the quickly entering gas mixture to such an extent that the limit of discharge of the catalyst is attained.

To each grain size there corresponds a limit of discharge which is attained at a certain speed of flow of the gas mixture. In order to illustrate this, it may be mentioned that a speed of flow of gas can be adjusted at which the limit of discharge of a part of the catalyst is reached or exceeded, while the limit of discharge of another part of the catalyst is not yet attained. We have found, that, under these conditions of operating at the limit of discharge, very good yields and a very good efficiency of the catalyst can be attained, since the exchange of heat and material in the fluidized bed is then already very good. On the other hand, a relatively small quantity of catalyst substance is discharged and the degree of abrasion is smaller at comparatively higher speeds of flow of the gas at which the catalyst is entirely liable to pneumatic transport through the reaction vessel.

Since, in order to maintain the state of fluidizing which is particularly favourable for the realization of the process of the invention, a definite speed of flow of the gas is necessary, the time of stay can only be modified by varying the height of the fluidizing bed or by diluting the reaction mixture in an appropriate manner with an inert gas. When these conditions are taken into consideration, the time of stay can always be modified. It may be within the range of 0.2 to 50 seconds, preferably 0.5 to 20 seconds.

The composition of the gas mixture with which the reaction vessel is charged, may vary within wide limits. The proportion of ammonia to olefinic hydrocarbon is preferably within the range of 1.0 to 1.5, in order to prevent the formation of unsaturated aldehydes. The proportion of oxygen to olefinic hydrocarbon is preferably within the range of 1.5 to 2.5. The oxygen may be used in the form of air.

It has also proved advantageous to add an inert gas, such as nitrogen, a saturated hydrocarbon, steam or carbon dioxide, to the reaction mixture, the addition of steam and/or carbon dioxide having proved particularly useful.

The following remarks are made with regard to the carrying out of the process for preparing nitriles by reacting olefins with oxygen and ammonia in the presence of a catalyst according to the invention.

The olefinic hydrocarbon is treated with oxygen, for example in the form of air, which is preferably used in about 1.5 to 2.5 times the molar quantity, and with ammonia which is preferably used in about 1.0 to 1.5 times the molar quantity, at a temperature within the range of about 300° to 465° C. and under a pressure within the range of about 0.3 to 10 atmospheres (absolute) in the presence of a catalyst comprising an oxide mixture of elements which has the general composition $Me_aMo_bP_c$, in which formula $a$, $b$ and $c$ represent the numbers of atoms, $a$ standing for a number within the range of 1 to 20, $b$ standing for a number within the range of 1 to 10 and $c$ standing for a number within the range of 0 to 3, and Me stands for one or more metals of the first transitional period of the Periodic Table of elements, in particular vanadium, chromium, manganese, iron, cobalt and/or nickel in which case the number of atoms ($a$) of each individual metal must not exceed 10.

The catalyst is preferably applied to a carrier which may be constituted by silicic acid or another inert material, such as pulverized pumice, smelter-slag pumice, kieselguhr, aluminum oxide or alumina or by a mixture of such substances. The quantity of carrier material amounts to about 30 to 95% by weight, preferably 50 to 80% by weight, of the finished catalyst which may be used in the form of grains having a diameter within the range of about 0.01 to 1.0 millimeter, preferably of about 0.05 to 0.5 millimeter.

According to the invention, the reaction is, in particular, carried out under normal pressure or a slightly superatmospheric pressure of up to about 5 atmospheres (absolute) and at a temperature within the range of about 350° to 450° C. The time of stay of the gaseous mixture of olefin, air and ammonia over the catalyst is within the range of about 0.2 to 50 seconds, preferably about 0.5 to 20 seconds. A part of the air or oxygen may be introduced secondarily into the reaction zone. The proportion by volume of olefinic hydrocarbon to ammonia to air is, for example, within the range of 1:1:7.5 to 1:1:12.

The process according to the invention is preferably carried out in the presence of an inert gas or diluent, for example, steam, carbon dioxide, nitrogen or a saturated hydrocarbon. For example, about 0 to 20 mols of water in the form of steam are added to the reaction mixture as a diluent per mol of olefinic hydrocarbon.

The process of the present invention is preferably carried out in a flowing bed reactor or a fluidized bed reactor. When the process is carried out in a fluidized bed reactor, a speed of flow is maintained which is near the limit of discharge of the catalyst.

For the preparation of acrylonitrile, propylene is used and for the preparation of methacrylonitrile, isobutylene is used.

It is not necessary to use a definite type of reactor for carrying out the process of the invention. However, two forms of apparatus have proved particularly suitable. They will now be described in greater detail by way of example only with reference to the accompanying drawings.

Referring now to the drawings, the apparatus shown in FIGURE 1 comprises a reaction vessel provided internally with a means for reconducting the catalyst discharged from the fluidized bed. The starting gas mixture is introduced via conduit 17 through perforated bottom 2 into reaction tube 3, catalyst substance 4 charged into the reaction tube attaining approximately height limit 5. The gas whirls up the catalyst and entrains it into quiescent vessel 6 whose inside cross-sectional area is approximately five times as large as that of reaction tube 3 and in which the speed of flow of the gas is reduced and drops to below the speed of discharge of substantially all grain sizes, so that the catalyst falls back into reaction tube 3. Small quantities of the catalyst, in particular of the pulverulent portion of the catalyst, which do not fall back are separated in cyclone 7 and fall back through fall pipe 8 into reaction tube 3. The lower end of fall pipe 8 is screened by means of cup 9 in order to prevent the gas introduced at 17 from penetrating from the bottom into fall pipe 8. The gas leaves cyclone 7 via exhaust pipe 10.

Reaction tube 3 is maintained at the desired reaction temperature while quiescent vessel 6 and exhaust gas pipe 10 are maintained at about 300° C. Along the whole length of reaction tube 3 are distributed short pipes 11 which serve for the arrangement of thermoelements, for measuring the pressure and for introducing further quantities of gas. For dissipating the heat of the exothermic reaction, heat exchangers 12 are provided which may be charged with a heat transferring agent via recycle conduit 13 by means of pump 16. By means of the same recycle system the reaction may be started by heating. The heat is removed from the cycle via cooler 14 and supplied via heater 15, which cooler 14 and heater 15 may be used optionally.

Figure 2:
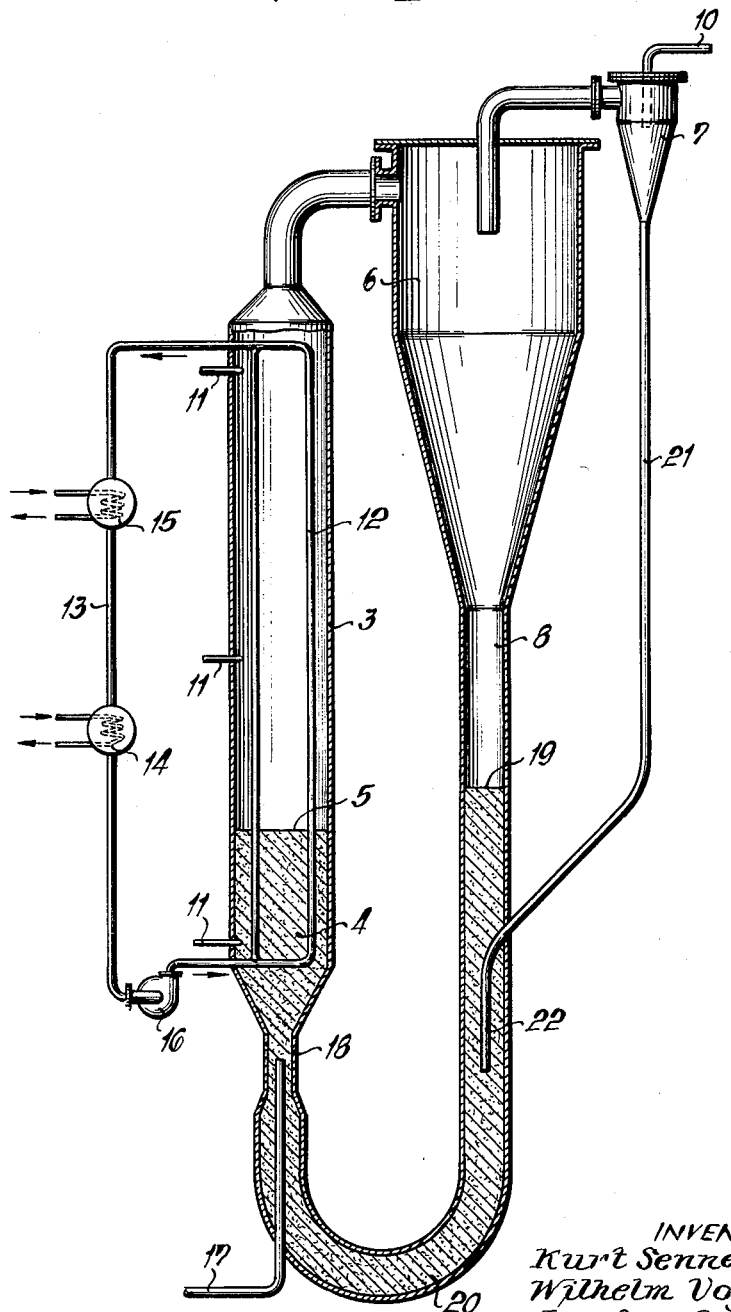

In the form of apparatus shown in FIGURE 2, the catalyst is returned outside the apparatus. The starting mixture is introduced via conduit 17 at necked-down portion 18 into reaction tube 3 in which it whirls up catalyst 4 which, in the state in which it is charged into the apparatus, approximately attains height limit 5 and it partly discharges it into the cyclone-shaped separator 6 from where the catalyst falls down through down-pipe 8. In down-pipe 8 the catalyst comes approximately to height limit 19. The catalyst is returned from down-pipe 8 through connecting bend 20 into reaction tube 3 by means of the current of gas entering at 18 and passing in bubbles through the catalyst. On leaving separator 6, the gas enters cyclone 7 in which the last constituents of the catalyst are retained and returned to the cycle via down-pipe 21 which is immersed within down-pipe 8 at 22 into the catalyst. The exhaust gas escapes via pipe 10.

Reaction tube 3 is provided with means 11 serving for the arrangement of thermoelements, for measuring the pressure and for the introduction of further quantities of gas. Heat transferring cycle 13, which includes pump 16, enables heat to be eliminated from reaction tube 3 via heat exchange elements 12 or the reaction to be initiated by heating. The heat transferrer may be cooled by cooler 14 and heated by heater 15. The following examples serve to illustrate the invention but they are not intended to limit it thereto.

*Example 1*

A catalyst comprising iron oxide and molybdenum oxide was prepared in the following way:

365 grams of ferric nitrate $Fe(NO_3)_3 \cdot 9N_2O$ and 208 grams of ammonium paramolybdate

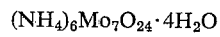

$$(NH_4)_6Mo_7O_{24} \cdot 4H_2O$$

were dissolved in water and mixed with 2700 grams of an aqueous solution of 14% strength of colloidal silicic acid. After the addition of 10 cc. of phosphoric acid of 85% strength the mixture was evaporated until it had the consistency of a paste. The mass was then dried for 16 hours at 150° C. and then roasted for 16 hours at 550° C. The roasted catalyst was ground and the grains having diameters within the desired range were sieved out.

The catalyst which had thus been prepared had approximately the following composition:

11.45% by weight of $Fe_2O_3$,
26.9% by weight of $MoO_3$,
1.65% by weight of $P_2O_5$,
60.0% by weight of $SiO_2$.

The proportion of the active components corresponded to the formula $Fe_{1.0}Mo_{1.3}P_{0.16}$.

*Example 2*

A catalyst comprising iron oxide, nickel oxide and molybdenum oxide was prepared in the following manner: 730 grams of ferric nitrate $Fe(No_3)_3 \cdot 9H_2O$ and 317.5 grams of ammonium paramolybdate

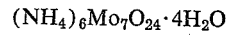

$$(NH_4)_6Mo_7O_{24} \cdot 4H_2O$$

and 262 grams of nickel nitrate $Ni(NO_3)_2 \cdot 6H_2O$ were dissolved in water and mixed with 5260 grams of an aqueous solution of 14% strength of colloidal silicic acid. After the addition of 20 cc. of phosphoric acid of 85% strength the suspension was evaporated until it had the consistency of a paste. The catalyst mass was dried for 16 hours at 150° C. and subsequently roasted for 16 hours at 550° C. The catalyst was then ground and the grains having diameters within the desired range were sieved out.

The finished catalyst had approximately the following composition: 11.7% by weight of $Fe_2O_3$, 5.5% by weight of NiO, 21.1% by weight of $MoO_3$, 1.7% by weight of $P_2O_5$ and 60.0% by weight of $SiO_2$.

The composition of the active components corresponded to the following formula: $Fe_{1.0}Ni_{0.5}Mo_{1.0}P_{0.16}$.

*Example 3*

Of the catalyst described in Example 1 grains having a diameter within the range of 0.1 to 0.2 millimeter were sieved out. The bulk density was 0.665 gram per milliliter 1.10 liters of this catalyst were introduced into a fluidized bed reactor as shown in FIG. 1, the reaction tube of which had a length of about 5 meters and an inside cross-sectional area of about 15 square centimeters.

The reaction vessel was kept at a temperature of +425° C. The following quantities of gas were introduced via a premixing apparatus: 1100 liters per hour of air, 140 liters per hour of propylene, 140 liters per hour of ammonia, 680 liters per hour of steam. The volumes were measured at 25° C., under a pressure of 760 mm. Hg.)

The speed of flow of the gas mixture in the reaction tube amounted to about 90 centimeters per second and the time of stay was about 5.5 seconds. These values apply only to the empty tube and are consequently only apparent values.

In order to determine the degree of conversion and the yield, the exhaust gas was cooled in known manner, washed with aqueous 2 N sulfuric acid and the dissolved products, viz., hydrocyanic acid, acetonitrile and acrylonitrile, were distilled off together from the sulfuric acid solution. The content of unreacted ammonia was determined by back-titration of the sulfuric acid. The components of the exhaust gas escaping during the washing with sulfuric acid were ascertained by analysis in known manner.

181 grams per hour of a crude distillation product were obtained which contained the following chief constituents: 61.3% by weight of acrylonitrile, 1.6% by weight of acetonitrile, 26.3% by weight of hydrocyanic acid and 10.6% by weight of water.

The residual gas contained 45 grams of carbon dioxide and 27 grams of carbon monoxide.

The extent of conversion amounted to 59.5%, calculated on the propylene used, and to 72%, calculated on the ammonia used.

The yields, calculated on the propylene and the ammonia that had undergone conversion, are indicated in the following table:

| Yield of— | Calculated on— | |
|---|---|---|
| | Propylene | Ammonia |
| Acrylonitrile, percent | 61.6 | 50.7 |
| Acetonitrile, percent | 1.5 | 1.7 |
| Hydrocyanic acid, percent | 17.4 | 42.7 |
| Total yield, percent | 80.5 | 95.1 |

The efficiency of the catalyst, calculated on acrylonitrile, was:

Yields per volume of catalyst: 101 grams of acrylonitrile per liter and per hour;
Activity of the catalyst component, calculated on $MoO_3$: 0.56 kilogram of acrylonitrile per kilogram of $MoO_3$ and per hour.

*Example 4*

Of the catalyst described in Example 2 grains having a size within the range of 0.1 to 0.2 millimeter were sieved out. The bulk density was 0.524 gram per milliliter. 1.4 liters of this catalyst were introduced into a fluidized bed reactor as shown in FIG. 1, the reaction tube of which had a length of about 5 meters and an inside cross-sectional area of about 15 square centimeters. The reaction tube was kept at a temperature of 425° C. and the same quantities of gas as in Example 3 were introduced. The apparent speed of flow and the apparent time of stay were consequently the same as in Example 3. The degree of conversion and the yield were likewise determined in the manner described in Example 3.

225 grams per hour of crude distillation product were obtained which contained the following chief constituents: 63.9% by weight of acrylonitrile, 5.4% by weight of acetonitrile, 20.9% by weight of hydrocyanic acid and 9.6% by weight of water.

The residual gas contained 41 grams of carbon dioxide and 25 grams of carbon monoxide.

The extent of conversion amounted to 71.5%, calculated on the propylene used, and to 86%, calculated on the ammonia used.

The yield, calculated on the propylene and the ammonia that had undergone conversion, are indicated in the following table:

| Yield of— | Calculated on— | |
|---|---|---|
| | Propylene | Ammonia |
| Acrylonitrile, percent | 66.1 | 53.3 |
| Acetonitrile, percent | 4.8 | 6.0 |
| Hydrocyanic acid, percent | 14.1 | 35.5 |
| Total yield, percent | 85.0 | 96.8 |

The efficiency of the catalyst, calculated on the acrylonitrile that had formed, was:

Yield per volume of catalyst: 102 grams of acrylonitrile per liter and per hour;
Activity of the catalyst components: 0.93 kilogram of acrylonitrile per kilogram of $MoO_3$ and per hour; 3.55 kilograms of acrylonitrile per kilogram of NiO and per hour.

We claim:

1. In a process for the manufacture of a compound selected from the group consisting of acrylonitrile and methacrylonitrile by reacting a gas selected from the group consisting of propylene and isobutylene, respectively, with ammonia and a member selected from the group consisting of air and oxygen at about 300° to 465° C. under a pressure of about 0.3 to 10 absolute atmospheres on a catalyst applied to a carrier selected from the group consisting of silicic acid, pulverized pumice, kieselguhr, aluminum oxide and mixtures thereof, and with a time of stay of the gas mixture on the catalyst between 0.2 to 50 seconds, the improvement wherein said catalyst consists of $MoO_3$ and $P_2O_5$ and an oxide selected from the group consisting of $Fe_2O_3$ and NiO and mixtures thereof, in the form of grains having a diameter of about 0.01 to 1.0 millimeter, the gas mixture containing 1.5 to 2.5 mols of oxygen, 1.0 to 1.5 mols of ammonia and 0 to 20 mols of water in the form of steam per mol of propylene and isobutylene respectively.

2. The process of claim 1 wherein a member selected from the group consisting of carbon dioxide, nitrogen, saturated hydrocarbons and mixtures thereof is added to the gas mixture.

3. The process of claim 1 wherein the quantity of the carrier material amounts to about 30–95% by weight of the finished catalyst.

4. The process of claim 1 wherein the reaction is carried out with about 1 part by volume of propylene, 1 part of ammonia, 7.5 to 12 parts of air and an additional diluent selected from the group consisting of carbon dioxide, nitrogen, saturated hydrocarbons and mixtures thereof, at about 350° to 450° C. under a pressure in the range of normal pressure to about 5 absolute atmospheres, and with a time of stay of the gas mixture on the catalyst between 0.5 to 20 seconds, the catalyst being used in the form of grains having a diameter of about 0.05 to 0.5 millimeter.

5. The process of claim 1 wherein a fluidized bed reactor is used.

References Cited by the Examiner

UNITED STATES PATENTS 2,481,826  9/1949  Cosby _____ 260—465.3
2,642,454  6/1953  Mahan et al. _____ 260—465.3
3,009,943  11/1961 Hadley et al. _____ 260—465.3

CHARLES B. PARKER, *Primary Examiner.*
LEON ZITVER, *Examiner.*
JOSEPH P. BRUST, *Assistant Examiner.*